United States Patent
Teshima

(10) Patent No.: US 12,545,593 B2
(45) Date of Patent: Feb. 10, 2026

(54) METHOD FOR PRODUCING PHOTORESPONSIVE NANOPARTICLE WITH PEROVSKITE-TYPE CRYSTALLINE STRUCTURE

(71) Applicant: CANON KABUSHIKI KAISHA, Tokyo (JP)

(72) Inventor: Takayuki Teshima, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/523,575

(22) Filed: Nov. 29, 2023

(65) Prior Publication Data
US 2024/0174528 A1    May 30, 2024

(30) Foreign Application Priority Data
Nov. 30, 2022  (JP) .................. 2022-190927

(51) Int. Cl.
*C01G 21/00*    (2006.01)

(52) U.S. Cl.
CPC ........ *C01G 21/006* (2013.01); *C01P 2002/34* (2013.01); *C01P 2004/38* (2013.01); *C01P 2004/64* (2013.01); *C01P 2006/90* (2013.01)

(58) Field of Classification Search
None
See application file for complete search history.

(56) References Cited

FOREIGN PATENT DOCUMENTS

| CN | 110357148 A | * | 10/2019 | ............ B82Y 40/00 |
| CN | 110776000 A | * | 2/2020 | ............ C01G 21/00 |
| CN | 113684025 A | * | 11/2021 | ............ B82Y 40/00 |
| WO | WO 2020199310 A1 | * | 10/2020 | ............ B82Y 30/00 |

OTHER PUBLICATIONS

Zhang, Z., et al., "Rapid synthesis of quantum-confined CsPbBr3 perovskite nanowires using a microfluidic reactor", Nanoscale, 2019, pp. 18790-18796, No. 11.

* cited by examiner

*Primary Examiner* — Khanh T Nguyen
(74) *Attorney, Agent, or Firm* — Canon U.S.A., Inc. IP Division

(57) ABSTRACT

A method for producing a photoresponsive nanoparticle. The method includes a first step of continuously transporting a first raw material liquid containing a lead halide and a second raw material liquid containing a fatty acid cesium to a heated mixer through a transport path, and a second step of mixing the first raw material liquid and the second raw material liquid.

14 Claims, 2 Drawing Sheets

METHOD FOR PRODUCING PHOTORESPONSIVE NANOPARTICLE WITH PEROVSKITE-TYPE CRYSTALLINE STRUCTURE

BACKGROUND

Field

The present disclosure relates to a method for producing a photoresponsive nanoparticle with a perovskite-type crystalline structure.

Description of the Related Art

In recent years, compound materials with a perovskite-type crystalline structure have been newly studied for use in the field of photovoltaic power generation. Photoresponsive nanoparticles with a perovskite-type crystalline structure have also been studied for use in displays. Although photoresponsive nanoparticles with a perovskite-type crystalline structure have been synthesized by a batch-type hot injection method or a ligand-assisted reprecipitation method, flow synthesis has been studied because of the ease of controlling temperature and reaction time. Furthermore, the flow synthesis has an advantage over batch synthesis in that photoresponsive nanoparticles with a perovskite-type crystalline structure can be continuously synthesized by continuously feeding a raw material solution. Nanoscale 2019, 11 p. 18790 discloses that cesium carbonate is dissolved in oleic acid and octadecene to enable pumping and to synthesize photoresponsive nanoparticles with a perovskite-type crystalline structure of $CsPbBr_3$. While the reaction temperature and the reaction time are controlled by flow synthesis, photoresponsive nanoparticles with a perovskite-type crystalline structure with a nanowire shape and an emission peak wavelength in the range of 465 nm to 488 nm are synthesized in the reaction temperature range of up to 120° C.

For use in a display element, however, photoresponsive nanoparticles with a perovskite-type crystalline structure are required to have a longer emission peak wavelength of approximately 530 nm for green or approximately 630 nm for red. Furthermore, a larger amount of oleic acid is used to dissolve cesium carbonate than that used in a known hot injection method, thus resulting in a low product concentration. Thus, a large amount of waste liquid is produced in the isolation and purification of photoresponsive nanoparticles with a perovskite-type crystalline structure. Also from the perspective of productivity, it is desired to produce photoresponsive nanoparticles with a perovskite-type crystalline structure that can be used for display elements by flow synthesis at a high product concentration, and many improvements are required.

SUMMARY

The present disclosure has been made in view of such background art and provides a method for producing a photoresponsive nanoparticle with a perovskite-type crystalline structure that enables flow synthesis at a high product concentration.

An embodiment of the present disclosure provides a method for producing a photoresponsive nanoparticle with a perovskite-type crystalline structure, the method including a first step of continuously transporting a first raw material liquid containing a lead halide and a second raw material liquid containing a fatty acid cesium to a heated mixer through a transport path, and a second step of mixing the first raw material liquid and the second raw material liquid.

Further features of the present disclosure will become apparent from the following description of exemplary embodiments with reference to the attached drawings.

DESCRIPTION OF THE EMBODIMENTS

Figure 1:
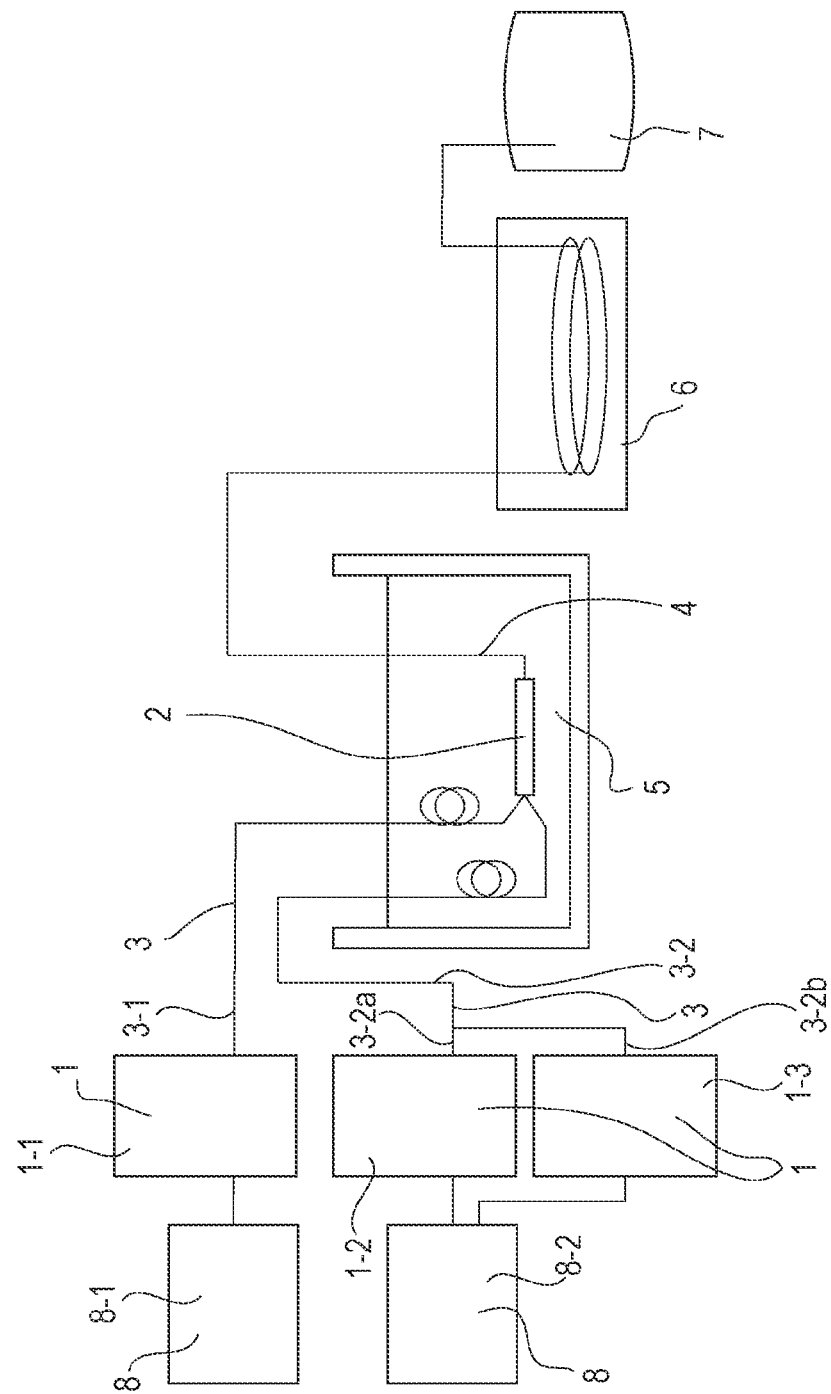
FIG. 1 is a process schematic view of flow synthesis of a photoresponsive nanoparticle with a perovskite-type crystalline structure according to an embodiment.

Preferred embodiments of the present disclosure are described in detail below with reference to the accompanying drawings. In the drawings, the same members are denoted by the same reference numerals and will not be repeatedly described.

Each embodiment is described in more detail below.

A method for producing a photoresponsive nanoparticle with a perovskite-type crystalline structure according to an embodiment of the present disclosure includes the following steps.

A first step of continuously transporting a first raw material liquid containing a lead halide and a second raw material liquid containing a fatty acid cesium to a heated mixer through a transport path A second step of mixing the first raw material liquid and the second raw material liquid Embodiments of the present disclosure are described below with reference to the drawings.

<Embodiments>

In the present embodiment, a method for producing a photoresponsive nanoparticle with a perovskite-type crystalline structure is described with reference to FIG. 1. Photoresponsive nanoparticles with a perovskite-type crystalline structure according to the present embodiment are produced by flow synthesis from a second raw material liquid containing a fatty acid cesium and a first raw material liquid containing a lead halide. The flow synthesis in the present embodiment includes continuously synthesizing a compound while a reaction liquid flows through a flow path or through a space of a mixer.

(Flow Synthesis Apparatus)

FIG. 1 is a process schematic view of the flow synthesis of the photoresponsive nanoparticles with a perovskite-type crystalline structure according to the present embodiment. In other words, FIG. 1 is a schematic view of a flow synthesis apparatus in which the step of the flow synthesis of the photoresponsive nanoparticles with a perovskite-type crystalline structure according to the present embodiment is performed.

The flow synthesis apparatus in FIG. 1 includes a pump 1, a front flow path 3, and a reaction liquid vessel 8 as elements of the flow synthesis related to the first step and the second step. Likewise, a pump 1, a front flow path 3, and a mixer 2 are illustrated as elements of the flow synthesis related to the second step. The first step and the second step are described later in detail.

In the flow synthesis apparatus illustrated in FIG. 1, the pump 1 and the front flow path 3 are arranged so that raw material liquids described later can be independently transported depending on the type, temperature, flow rate, and the like of the raw material liquids. In the present embodiment, the pump 1 can be composed of pumps 1-1 to 1-3, and the front flow path 3 can be composed of front flow paths 3-1 and 3-2. Likewise, the front flow path 3-2 can be composed of 3-2a and 3-2b (not shown) as flow paths before mixing. The reaction liquid vessels 8 can also be referred to as reaction liquid vessels 8-1 and 8-2.

The front flow path 3 is partially configured such that a raw material liquid transported is heated in an oil bath constituting the mixer 2 and with a heating unit provided in the oil bath. The heating unit provided in the oil bath includes a heater (not shown) and a fluid capable of convection, such as silicone oil. The oil bath may also be referred to as a thermostat or a constant temperature bath because the temperature range of the oil bath is controlled to achieve predetermined fluidity. Such a fluid may be oil, water, an aqueous solution, or the like with a thermal decomposition temperature higher than the heating temperature.

In the first step, as illustrated in FIG. 1, the first raw material liquid and the second raw material liquid (a first reaction liquid and a second reaction liquid) supplied from the reaction liquid vessels 8 (8-1, 8-2) are continuously fed to the mixer 2 using the pump 1. The reaction liquid is a raw material liquid before a synthesis reaction in the mixer in the following stage and is therefore also referred to as a raw material liquid. The reaction liquid is a liquid transported as a raw material for synthesis in the mixer 2 and is therefore also referred to as a raw material liquid, and the reaction liquid vessel is also referred to as a raw material liquid vessel.

The first raw material liquid (first reaction liquid) to be fed is supplied from the reaction liquid vessel (first raw material liquid vessel) at the upper left in FIG. 1. The second raw material liquid (second reaction liquid) to be fed is supplied from the reaction liquid vessel (second raw material liquid vessel) at the lower left of FIG. 1. The second raw material liquid vessel and two pumps 1 coupled to the second raw material liquid vessel are provided for feeding the second raw material liquid containing a fatty acid cesium to the mixer 2. The first raw material liquid vessel and the pump 1 coupled to the first raw material liquid vessel are provided for feeding the first raw material liquid containing a lead halide to the mixer 2.

In the present specification, liquid feed at room temperature means that the first and second raw material liquids can be fed without special heating. In the present specification, the fact that liquid can be fed without special heating means that the pump can operate without special heating.

The flow synthesis apparatus illustrated in FIG. 1 includes the front flow path 3 as a liquid feed tube for feeding liquid between the pump 1 and the mixer 2, a rear flow path 4 as a liquid feed tube for discharging liquid from the mixer 2, and a mixer with a heating unit 5. In a method for producing a perovskite-type photoresponsive material according to the present embodiment, the rear flow path 4 is partially heated by the heating unit 5. The mixer 2 in the present embodiment includes the heating unit 5 to heat a portion of the front flow path 3 and a portion of the rear flow path 4. The heating unit 5 heats a portion of the rear flow path 4 to a second temperature y° C. or more.

The flow synthesis apparatus illustrated in FIG. 1 further includes an ice-water bath 6 for cooling a synthesis liquid heated by the heating unit and fed from the mixer 2 through the rear flow path 4 after synthesis, and a collector 7 for collecting a synthetic material transported via the ice-water bath 6. The collector 7 collects photoresponsive nanoparticles with a perovskite-type crystalline structure.

Each of the second raw material liquid and the first raw material liquid is supplied from the reaction liquid vessel 8 to the pump 1. When the first raw material liquid and the second raw material liquid heated to a first temperature x° C. in the front flow path 3 are continuously fed into the mixer 2, the first raw material liquid and the second raw material liquid are mixed together while being heated from the first temperature x° C. to the second temperature y° C.

(Mixer Reaction Vessel)

The mixer 2 that can be used in the present embodiment can be, but is not limited to, a commercially available microreactor.

For example, a T-type reactor manufactured by YMC Co., Ltd., a three-way joint manufactured by FLOM Corporation, a type DH mixer or a type α mixer manufactured by Nakamura Choukou Co., Ltd., K2-24-M or K1-24M manufactured by Noritake Co., Ltd., SMCR manufactured by Kobe Steel, Ltd., or the like can be used. The liquid feed tubes used for the front flow path 3 and the rear flow path 4 are not particularly limited and may be made of synthetic resin, ceramic, glass, metal, or the like, or, from the perspective of heat resistance and corrosion resistance, stainless steel, nickel alloy, or the like. Such stainless steel is, for example, austenitic stainless steel, such as SUS304 or SUS316, or nickel alloy stainless steel, such as Hastelloy (registered trademark). The heating unit 5 is, but not limited to, an oil bath, a Peltier element, a ribbon heater, a rubber heater, a hot plate, or the like. Among these, an oil bath can heat a mixer and a liquid feed tube in the same vessel and can also easily bring the temperature of the reaction liquid close to the mixing temperature. Furthermore, the single heating unit 5 can feed the heated reaction liquid to the mixer without lowering the temperature of the reaction liquid. Separated heating units 5 (different heating units) for the mixer 2 and the front flow path 3 may decrease the temperature of the heated reaction liquid between the heating units.

(Pumping Unit)

The pump 1 that can be used in the present embodiment may be a diaphragm pump, a turbine pump, a piston pump, a screw pump, a plunger pump, a gear pump, a centrifugal pump, a propeller pump, or the like. Among these, a plunger pump has a less pulsating flow, and a multi-plunger enhances the effect of reducing the pulsating flow. A strong pulsating flow tends to vary the mixing ratio of reaction liquids.

(First Step)

This step includes the step of continuously transporting a first raw material liquid containing a lead halide and a second raw material liquid containing a fatty acid cesium to a heated mixer through a transport path.

In this step, the first raw material liquid and the second raw material liquid are fed. The transport path to the mixer 2 does not require a temperature for the reaction, and controlling the liquid feed amount and the liquid feed rate of the pump 1, that is, controlling the viscosity that affects the transport resistance below a predetermined upper viscosity limit obviates the need for heating and eases restrictions on a liquid feed pump. The restrictions on the pump include operational stability, temperature monitoring, the upper limit of the liquid feed amount per unit time, and the like. If necessary, a small-scale temperature control mechanism for liquid to be transported may be provided. The front flow path 3 is configured for a liquid feed operation in the temperature range of 5° C. to 65° C. including a room temperature range.

The front flow path 3 can perform a liquid feed operation in the temperature range of 5° C. or more and 35° C. or less.

The temperature can be increased to the first temperature x° C. in the front flow path 3. The mixer 2 in the present embodiment can increase the temperatures of the first raw material liquid and the second raw material liquid to 65° C. or less to adjust the viscosity of the raw material liquids.

The fatty acid cesium contained in the second raw material liquid includes a salt of cesium and a fatty acid. The fatty acid cesium can be synthesized by reacting cesium hydroxide or cesium oxide with a fatty acid. The fatty acid that forms a salt with cesium may be a saturated fatty acid or an unsaturated fatty acid. The fatty acid that forms a salt with cesium may be oleic acid, palmitoleic acid, linoleic acid, linolenic acid, arachidonic acid, docosahexaenoic acid, eicosapentaenoic acid, vaccenic acid, sapienic acid, nervonic acid, erucic acid, paullinic acid, osbond acid, docosatetraenoic acid, clupanodonic acid, eicosapentaenoic acid, eicosatetraenoic acid, stearidonic acid, acetic acid, pivalic acid, propionic acid, butyric acid, valeric acid, isovaleric acid, hydroangelic acid, caproic acid, enanthic acid, caprylic acid, pelargonic acid, or the like. A fatty acid cesium can be obtained as cesium acetate or cesium pivalate, which is a fatty acid cesium traded as a commercial product. A fatty acid cesium can also be obtained by converting a fatty acid cesium traded as a commercial product into a different fatty acid cesium by a reaction between the fatty acid cesium and a fatty acid. A fatty acid cesium can also be obtained by mixing different fatty acids to produce a fatty acid cesium mixture derived from fatty acids to be used. The fatty acid cesium may be a mixture of cesium acetate and cesium oleate produced by a reaction between cesium acetate and oleic acid.

The fatty acid cesium is used for the second raw material liquid as in the present embodiment to maintain a liquid state at normal temperature including 35° C. More specifically, a case in which cesium acetate is used as the fatty acid cesium is described below.

2 ml of oleic acid is added to cesium acetate equivalent to 1 mmol of cesium and is heated to form a mixture of cesium acetate and cesium oleate as the second raw material liquid, which maintains a liquid state in a liquid feed tube at normal temperature (5° C. or more and 65° C. or less) including 35° C. In FIG. 1, cesium acetate and oleic acid are contained in the reaction liquid vessels 8 (8-2a, 8-2b) coupled to the two front flow paths 3 (3-2a, 3-2b).

On the other hand, in the first step corresponding to a reference embodiment, cesium carbonate equivalent to 1 mmol of cesium is added to 2 ml of oleic acid, is heated to form a mixture of cesium carbonate and cesium oleate, and is then cooled to 35° C. to precipitate a solid derived from cesium carbonate. To avoid the precipitation of a solid derived from cesium carbonate, it is necessary to add a large amount of oleic acid as in Nanoscale 2019, 11 p. 18790. The addition of a large amount of oleic acid decreases the concentration of cesium in the second raw material liquid and consequently makes it difficult to produce photoresponsive nanoparticles with a perovskite-type crystalline structure at a high concentration. The use of a fatty acid cesium as in the present embodiment enables the second raw material liquid, which is a liquid at 5° C. to 35° C., to be prepared even with a small amount of oleic acid and enables photoresponsive nanoparticles with a perovskite-type crystalline structure to be produced at a high concentration.

The addition of a fatty acid (excessive fatty acid) that does not form a salt to a reaction liquid containing a fatty acid cesium makes it easy for the second raw material liquid to maintain fluidity at 5° C. to 65° C. A fatty acid to be contained in the second raw material liquid is selected from fatty acids that are in a liquid state in a certain temperature range between 5° C. and 65° C. Without a liquid phase temperature range between 5° C. and 65° C., it is likely to be difficult to feed a liquid using a pump.

(Fatty Acid Applicable to Second Raw Material Liquid)

A fatty acid to be contained in the second raw material liquid in the present embodiment may be oleic acid, palmitoleic acid, linoleic acid, linolenic acid, arachidonic acid, docosahexaenoic acid, eicosapentaenoic acid, vaccenic acid, or the like. These fatty acids have a liquid temperature range between 5° C. and 65° C.

(High-Boiling Solvent Applicable to Second Raw Material Liquid)

A high-boiling solvent may be added to decrease the viscosity of the second raw material liquid and reduce the pressure loss of liquid feed with a pump. The high-boiling solvent can be selected from high-boiling solvents with a boiling point higher than the second temperature y° C. corresponding to the reaction temperature. A solvent with a boiling point lower than the second temperature (the reaction temperature in the mixer 2) y° C. is likely to boil and may induce a backflow or a pulsating flow due to the occurrence of cavitation. The high-boiling solvent for use in the present embodiment may be 1-octadecene, hexadecene, tetradecane, pentadecane, heptadecane, octadecane, tridecene, tridecane, tetradecene, pentadecene, or the like.

The second raw material liquid of the present embodiment containing the fatty acid or the high-boiling solvent described above and having fluidity as a liquid phase in a temperature range with a temperature difference of at least 10° C. between 5° C. and 65° C. tends to be easily fed using a typical liquid feed pump. For example, a commercially available plunger pump has an operating temperature range specification of 5° C. to 35° C. and is operable in a temperature range with a temperature difference of at least 10° C. between 5° C. and 65° C. A typical liquid feed pump can be used when the second raw material liquid has fluidity in a temperature range of at least 10° C. between 5° C. and 65° C.

In consideration of these, the high-boiling solvent for use in the preparation of the second raw material liquid is appropriately selected from high-boiling solvents with fluidity in a temperature range of at least 10° C. between 5° C. and 65° C. Among the raw material liquids for use in the method for producing the perovskite-type photoresponsive nanoparticles according to the present embodiment, a raw material liquid containing a lead halide is used as the first raw material liquid. Thus, in other words, the first step is performed to have a transport section for continuous transport in a temperature range of at least 10° C. in the temperature range of 5° C. or more and 65° C. or less.

The phrase "first raw material liquid containing a lead halide", as used herein, means that the lead halide is used in the preparation of the first raw material liquid, and the state of the lead halide is not necessarily required in the first raw material liquid. For example, in the first raw material liquid, the halogen may form a salt with a cation different from lead. Likewise, in the first raw material liquid, lead may form a salt with an anion different from halogen. The first raw material liquid in the present embodiment is a raw material liquid containing a lead halide. Like the second raw material liquid, the first raw material liquid is also prepared to have fluidity in a temperature range of at least 10° C. between 5° C. and 65° C. in order for liquid feed with a pump. To convert a lead halide into a liquid with fluidity in a temperature range of at least 10° C. between 5° C. and 65° C., an acid or an amine is added to the lead halide to form a salt.
(Acid Applicable to First Raw Material Liquid)

An acid for use in the present embodiment may be a fatty acid used in the second raw material liquid and can be selected from the fatty acids with a boiling point higher than the second reaction temperature y° C. Specific examples thereof include oleic acid, palmitoleic acid, linoleic acid, linolenic acid, arachidonic acid, docosahexaenoic acid, eicosapentaenoic acid, vaccenic acid, and the like, which have fluidity in a temperature range of at least 10° C. between 5° C. and 65° C.
(Amine Applicable to First Raw Material Liquid)

Likewise, an amine for use in the present embodiment can be selected from amines with a high-boiling point and can be selected from amines with a boiling point higher than the second reaction temperature y° C. Specific examples thereof include laurylamine, myristylamine, palmitylamine, stearylamine, oleylamine, and the like. Among these amines, oleylamine, which has fluidity in a temperature range of at least 10° C. between 5° C. and 65° C., can be used. As in the second raw material liquid, a high-boiling solvent may be added to the first raw material liquid to decrease the viscosity of the first raw material liquid and reduce the pressure loss of liquid feed with a pump.
(High-Boiling Solvent Applicable to First Raw Material Liquid)

The high-boiling solvent for use in the present embodiment may be 1-octadecene, hexadecene, tetradecane, pentadecane, heptadecane, octadecane, tridecane, tridecane, tetradecene, pentadecene, or the like. Like the second raw material liquid, the first raw material liquid of the present embodiment containing the fatty acid or the high-boiling solvent described above and having fluidity in a temperature range of at least 10° C. between 5° C. and 65° C. can be fed using a typical liquid feed pump.

In the present embodiment, the first raw material liquid and the second raw material liquid are fed. To reduce the feed resistance of at least one of the first raw material liquid and the second raw material liquid, the temperature in the front flow path 3 is increased to the first temperature x° C. in the flow path behind the pump 1, which is a liquid feed means. The first temperature x° C. is determined in consideration of the second temperature y° C. required for the synthesis reaction. A temperature equal to or close to the second temperature y° C. may be employed.

The heating unit 5 common to the mixer 2 and a portion of the rear flow path 4 can be used to heat the first raw material liquid and the second raw material liquid to the second temperature y° C. More specifically, the residence time in the front flow path is controlled on the basis of the liquid feed rate. At a fixed liquid feed rate, the length of the front flow path can be increased to increase the residence time in the front flow path and increase the temperature to approximately the second temperature y° C.
(Second Step)

This step includes the step of mixing the first raw material liquid and the second raw material liquid.

In this step, the first raw material liquid and the second raw material liquid are continuously fed to the mixer 2. With respect to the temperature (feed temperature) at the time of feeding the first raw material liquid and the second raw material liquid, the difference between the first temperature x° C. and the second temperature y° C. can be reduced to mix the first raw material liquid and the second raw material liquid in a narrow temperature range. As described above, the single oil bath of the heating unit 5 can feed the first and second raw material liquids, which have been heated to the first temperature x° C., to the mixer without lowering the temperatures of the first and second raw material liquids.

In this step, the first raw material liquid and the second raw material liquid may be mixed together in the mixer 2 at the second temperature y° C. More specifically, the reaction temperature in the second step may be the same as the feed temperature in the first step or may be higher than the feed temperature in the first step.

In the mixer 2 in the present embodiment, the mixing of the first raw material liquid and the second raw material liquid is completed. The mixer 2 includes a portion of the rear flow path 4. More specifically, the mixer 2 completes the mixing using a portion of the rear flow path 4 in one embodiment, and a portion of the rear flow path 4 constitutes the mixer 2. Thus, the length of the rear flow path is appropriately adjusted depending on the progress of mixing or reaction.
(Photoresponsive Nanoparticle with Perovskite-Type Crystalline Structure)

Disclosed is a compound with a perovskite-type crystalline structure that constitutes photoresponsive nanoparticles with a perovskite-type crystalline structure synthesized in the present embodiment. Specific examples include $CsPbBr_3$, $CsPbCl_3$, $CsPbI_3$, $CsPbBr_{(3-y)}I_y$ ($0<y<3$), and $CsPbBr_{(3-y)}Cl_y$ ($0<y<3$). The present embodiment may also include a perovskite compound with a two-dimensional structure represented by $A_2BX_4$. Specific examples include $Cs_2PbBr_4$, $Cs_2PbCl_4$, $Cs_2PbI_4$, $Cs_2PbBr_{(4-y)}I_y$ ($0<y<4$), and $Cs_2PbBr_{(4-y)}Cl_y$ ($0<y<4$). Photoresponsive nanoparticles with a perovskite-type crystalline structure may be doped with Eu, Gd, Yb, Mn, Ce, Bi, Sm, Ho, or Tb.

The photoresponsive nanoparticles with a perovskite-type crystalline structure of the present embodiment may have different particle diameters depending on the synthesis temperature. The difference between the first temperature x° C. and the second temperature y° C. can be reduced to easily synthesize photoresponsive nanoparticles with a perovskite-type crystalline structure with uniform particle diameters. The emission peak wavelength may vary with the particle diameter, and the difference between the first temperature x° C. and the second temperature y° C. can also be reduced to decrease the half-value width of an emission peak. The first temperature x° C. and the second temperature y° C. are determined in the range represented by the general formula (2):

$$120° C. \leq x \leq 240° C., 120° C. \leq y \leq 240° C., abs(y-x) \leq 20° C. \qquad \text{General formula(2)}$$

abs(z) denotes the absolute value of (z). The temperature difference between the first temperature and the second temperature is more preferably 10° C. or less, still more preferably 5° C. or less.

Within the range represented by the general formula (2), cubic photoresponsive nanoparticles with a perovskite-type crystalline structure and with uniform particle diameters tend to be selectively synthesized particularly at high temperatures.

In the synthesis of the photoresponsive nanoparticles with a perovskite-type crystalline structure of the present embodiment, the first raw material liquid and the second raw material liquid are fed to a mixer at a mole ratio represented by the general formula (3). Although lead and cesium may be stoichiometrically equimolar, from the perspective of the use of a lead halide ($PbX_2$) and the yield, liquids can be fed to a mixer at a molar concentration ratio represented by the general formula (3):

$$[Pb]/[Cs] \geq 2.15 \qquad \text{General formula (3)}$$

EXEMPLARY EMBODIMENTS

Exemplary Embodiment 1

In the present exemplary embodiment, a specific example of a method for producing a photoresponsive nanoparticle with a perovskite-type crystalline structure according to an embodiment is described with reference to FIG. 1 and FIGS. 2A to 2C.

The heating unit 5 was an oil bath controlled at a temperature of 185° C. The pump 1 was a plunger pump PU714M manufactured by GL Sciences Inc., and the mixer 2 was K2-24-M manufactured by Noritake Co., Ltd. The front flow path 3 between the pump 1 and the mixer 2 was a SUS 314 tube with an outer diameter of 1/8 inches and an inner diameter of 2.17 mm. The rear flow path 4 from the mixer to the discharge section was also the SUS 314 tube. A portion of the rear flow path 4 with a length of 0.18 m from the connecting portion with the mixer 2 was immersed in the oil bath together with the mixer 2 and was coupled to the collector 7 via the atmosphere and the ice-water bath 6. A reaction liquid with the following composition was prepared as described below. The first raw material liquid was heated to 160° C. and, after confirming that lead bromide was dissolved, was slowly cooled to 23° C. while degassing. In the second raw material liquid, oleic acid was added to cesium acetate, was heated at 120° C. for 30 minutes, was dissolved while degassing, and was slowly cooled to 18° C. Subsequently, 1-octadecene was added thereto to prepare a mixed solution of cesium acetate and cesium oleate. The second raw material liquid and the first raw material liquid were liquid at 23° C. and could be pumped without any precipitate.

Second Raw Material Liquid
  Cesium acetate 15.5 (g) (Cs: 80.7 mmol)
  Oleic acid 161.4 (ml)
  1-octadecene 1000 (ml)
  First raw material liquid
  Lead bromide 59.0 (g) (160.9 mmol)
  Oleic acid 710.2 (ml)
  Oleylamine 710.2 (ml)
  1-octadecene 840 (ml)

Figure 2A:
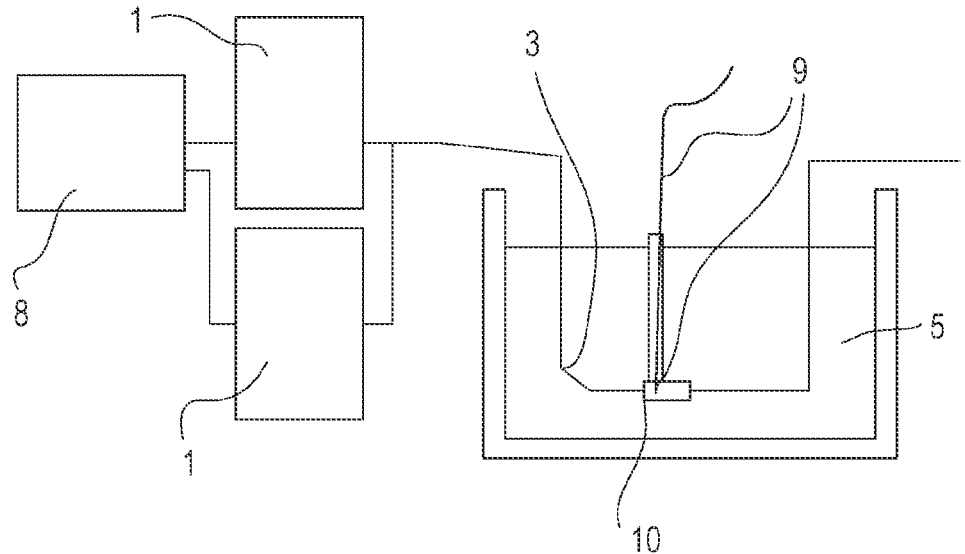
FIGS. 2A to 2C are process schematic views of a method for producing a photoresponsive nanoparticle with a perovskite-type crystalline structure according to an embodiment.
Figure 2B:
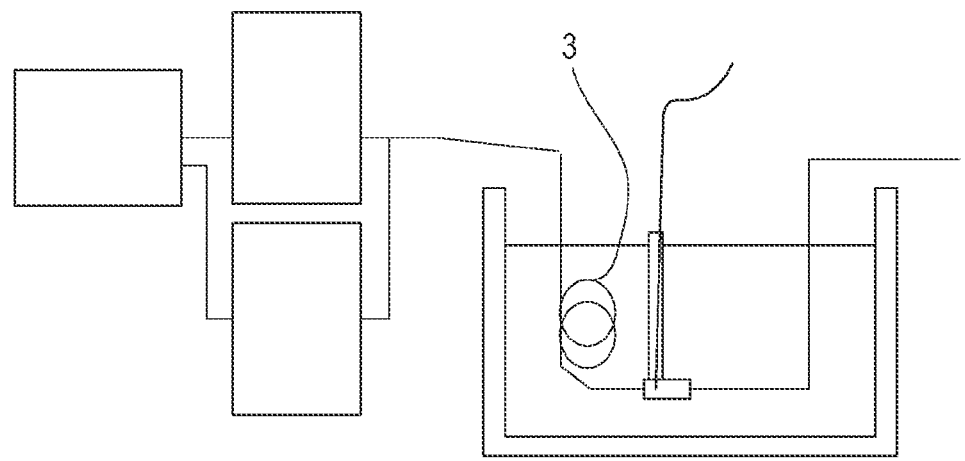
Figure 2C:
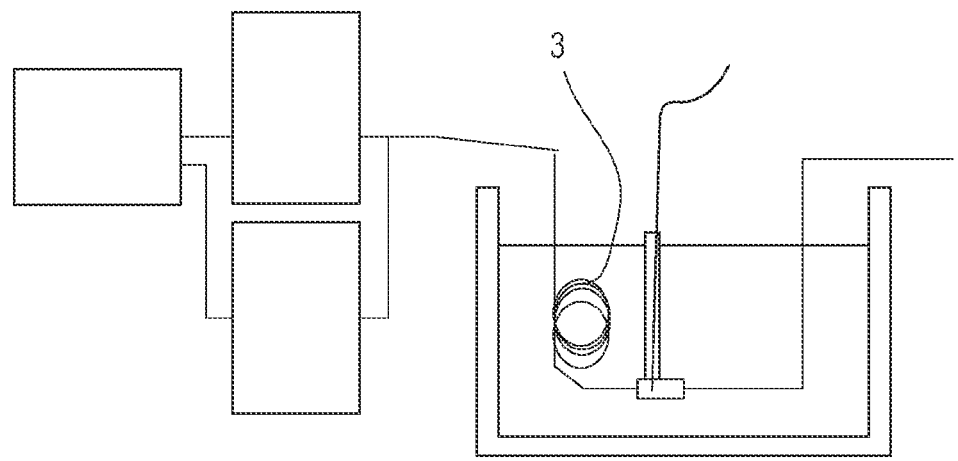

As illustrated in FIGS. 2A to 2C, two pumps were used to feed the first raw material liquid at room temperature at 22 ml/min and perform the step corresponding to part of the first step. The temperature of the first raw material liquid discharged from an endpoint 10 of the front flow path 3 immersed in the oil bath controlled with the heating unit 5 at a temperature of 185° C. was measured with a thermocouple 9. As illustrated in 2A to 2C, while the length of the front flow path 3 immersed in the oil bath was increased, it was confirmed that the temperature was increased to 184.8° C. when the length was 1.2 m. In the same manner, the second raw material liquid at room temperature was fed at 18 ml/min, and the temperature reached 185° C. when 1.2 m of the front flow path was immersed, as in the case of the first raw material liquid.

The front flow paths 3 for the second raw material liquid and the first raw material liquid were coupled to the mixer 2 so as to be immersed in the common oil bath in the mixer 2 at a length of 1.2 m. Thus, the second raw material liquid and the first raw material liquid heated to 184.8° C. and 185° C., respectively, are continuously fed to the mixer 2. When the second raw material liquid is fed at 18 ml/min and the first raw material liquid is fed at 22 ml/min, these liquids are fed to the mixer 2 at a molar concentration ratio of lead to cesium of [Pb]/[Cs]=2.17.

The mixer 2 was immersed in the oil bath controlled at a temperature of 185° C., and the reaction liquids were mixed at 185° C. in the mixer to synthesize photoresponsive nanoparticles ($CsPbBr_3$) with a perovskite-type crystalline structure. The crude synthesis liquid containing the photoresponsive nanoparticles with a perovskite-type crystalline structure was cooled in the ice-water bath 6 and was discharged into the collector 7 at a rate of 40 ml/min. Ethyl acetate was added to the crude synthesis liquid, and photoresponsive nanoparticles with a perovskite-type crystalline structure coordinated with oleic acid and oleylamine were produced as a precipitate by centrifugation. It was found from the dry weight after the addition of hexane and redispersion that 0.36 g of the photoresponsive nanoparticles with a perovskite-type crystalline structure coordinated with oleic acid and oleylamine were produced in 10 ml of the crude synthesis liquid, which proved the production at a high concentration. Evaluation of emission of blue-light-emitting diode light with a maximum peak wavelength of 445 nm showed that the photoluminescence quantum yield (PLQY) was 78% and the half-value width of an emission peak at an emission peak wavelength of 518 nm was 19 nm. The average particle diameter was approximately 20 nm in a cubic shape when evaluated with a transmission electron microscope (TEM).

Comparative Example 1

A second raw material liquid with the following composition was prepared by using cesium carbonate, which is not fatty acid cesium, instead of cesium acetate in the composition of the reaction liquid of Exemplary Embodiment 1. In the second raw material liquid, oleic acid was added to cesium carbonate, was heated at 120° C. for 30 minutes, and was slowly cooled to 35° C. while degassing, thus precipitating cesium carbonate. The mixture did not become a liquid even after being cooled to 5° C. Although 1-octadecene was added to the mixture, and the mixture was heated at 120° C. for 30 minutes, the precipitated cesium carbonate did not dissolve in the mixture, so that the second raw material liquid could not be fed with the pump used in Exemplary Embodiment 1.

Second Raw Material Liquid
  Cesium carbonate 13.2 (g) (Cs: 80.7 mmol)
  Oleic acid 161.4 (ml)
  1-octadecene 1000 (ml)

Exemplary Embodiment 2

The present exemplary embodiment was performed in the same manner as in Exemplary Embodiment 1 except that the first raw material liquid had the following composition, the first heating temperature x° C. of the reaction liquid was 239.4° C., and the second mixing temperature y° C. was 240° C. As a result, photoresponsive nanoparticles ($CsPbBr_{(3-y)}I_y$) with a perovskite-type crystalline structure were synthesized. The emission yield PLQY was 78%, and the half-value width of an emission peak at an emission peak wavelength of 657 nm was 34 nm.

First Raw Material Liquid
  Lead bromide 24.0 (g) (6.5 mmol)
  Lead iodide 71.2 (g) (154.3 mmol)
  Oleic acid 710.2 (ml)
  Oleylamine 710.2 (ml) 1-octadecene 840 (ml)

Exemplary Embodiment 3

In the present exemplary embodiment, photoresponsive nanoparticles ($CsPbBr_3$) with a perovskite-type crystalline structure were synthesized in the same manner as in Exemplary Embodiment 1 except that the second raw material liquid had the following composition, and emission properties equivalent to those in the exemplary embodiments were obtained.

Second Raw Material Liquid
  Cesium pivalate 18.9 (g) (Cs: 80.8 mmol)
  Linoleic acid 159.2 (ml)
  1-octadecene 998 (ml)

Exemplary Embodiment 4

The present exemplary embodiment was performed in the same manner as in Exemplary Embodiment 1 except that the first raw material liquid had the following composition, the first heating temperature x° C. of the reaction liquid was 120° C., and the second mixing temperature y° C. was 120° C. As a result, photoresponsive nanoparticles ($CsPbI_3$) with a perovskite-type crystalline structure doped with gadolinium were synthesized. Evaluation of light emission showed that PLQY was 75.6%, and the half-value width of an emission peak at an emission peak wavelength of 677 nm was 51 nm.

First Raw Material Liquid
  Lead iodide 74.2 (g) (160.9 mmol)
  Gadolinium acetate tetrahydrate 5.36 (g)
  Oleic acid 710.2 (ml)
  Oleylamine 710.2 (ml) 1-octadecene 840 (ml)

Exemplary Embodiment 5

The present exemplary embodiment was performed in the same manner as in Exemplary Embodiment 1 except that the first raw material liquid had the following composition, thereby synthesizing photoresponsive nanoparticles ($CsPbBr_{(3-y)}Cl_y$) with a perovskite-type crystalline structure at a high concentration. Evaluation of light emission showed that PLQY was 43%, and the half-value width of an emission peak at an emission peak wavelength of 454 nm was 18.5 nm.

First Raw Material Liquid
  Lead chloride 22.4 (g) (80.45 mmol)
  Lead bromide 29.5 (g) (80.45 mmol)
  Oleic acid 710.2 (ml)
  Oleylamine 710.2 (ml)
  1-octadecene 840 (ml)

The present application includes the following first to fifth configurations.

The first configuration includes
  a method for producing a photoresponsive nanoparticle with a perovskite-type crystalline structure, the method including
  a first step of continuously transporting a first raw material liquid containing a lead halide and a second raw material liquid containing a fatty acid cesium to a heated mixer through a transport path; and
  a second step of mixing the first raw material liquid and the second raw material liquid.

The second configuration includes the method for producing a photoresponsive nanoparticle according to the first configuration, wherein the fatty acid cesium includes cesium acetate.

The third configuration includes the method for producing a photoresponsive nanoparticle with a perovskite-type crystalline structure according to the first or second configuration, wherein the first step is performed to have a transport section for continuous transport in a temperature range of at least 10° C. in the temperature range of 5° C. or more and 65° C. or less.

The fourth configuration includes the method for producing a photoresponsive nanoparticle with a perovskite-type crystalline structure according to any one of the first to third configurations, wherein a mixing temperature in the mixer is 120° C. or more and 240° C. or less.

The fifth configuration includes the method for producing a photoresponsive nanoparticle with a perovskite-type crystalline structure according to any one of the first to fourth configurations, wherein the second step is performed so that a molar concentration ratio [Pb]/[Cs] is 2.15 or more. The molar concentration ratio [Pb]/[Cs] corresponds to the transport rate of lead in the first raw material liquid to the transport rate of cesium in the second raw material liquid.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-190927 filed Nov. 30, 2022, which is hereby incorporated by reference herein in its entirety.

What is claimed is:

1. A method for producing a photoresponsive nanoparticle with a perovskite-type crystalline structure, the method comprising:
  a first step of continuously transporting a first raw material liquid containing a lead halide and a second raw material liquid containing a fatty acid cesium to a heated mixer through a transport path; and
  a second step of mixing the first raw material liquid and the second raw material liquid,
  wherein the first step is performed to transport the second raw material liquid continuously through the transport path based on fluidity of the second raw material liquid in a liquid phase temperature range of at least 10° C. within a liquid feed operation temperature range of 5° C. or more and 65° C. or less.

2. The method for producing a photoresponsive nanoparticle with a perovskite-type crystalline structure according to claim 1, wherein the fatty acid cesium includes cesium acetate.

3. The method for producing a photoresponsive nanoparticle with a perovskite-type crystalline structure according to claim 1, wherein a mixing temperature in the mixer is 120° C. or more and 240° C. or less.

4. The method for producing a photoresponsive nanoparticle with a perovskite-type crystalline structure according to claim 1, wherein the second step is performed so that a molar concentration ratio [Pb]/[Cs] corresponding to a transport rate of lead in the first raw material liquid to a transport rate of cesium in the second raw material liquid is 2.15 or more.

5. The method for producing a photoresponsive nanoparticle with a perovskite-type crystalline structure according to claim 1, wherein the transport path includes a first flow path in communication with the heated mixer and a second flow path in communication with the heated mixer.

6. The method for producing a photoresponsive nanoparticle with a perovskite-type crystalline structure according to claim 5, wherein the first step includes continuously transporting the first raw material liquid through the first flow path to the heated mixer and continuously transporting the second raw material liquid through the second flow path to the heated mixer.

7. The method for producing a photoresponsive nanoparticle with a perovskite-type crystalline structure according to claim 5, wherein the first flow path is in communication with a first raw material liquid vessel and the second flow path is in communication with a second raw material liquid vessel.

8. The method for producing a photoresponsive nanoparticle with a perovskite-type crystalline structure according to claim 7, wherein the first step includes:
continuously transporting the first raw material liquid from the first raw material liquid vessel to the heated mixer via the first flow path; and
continuously transporting the second raw material liquid from the second raw material liquid vessel to the heated mixer via the second flow path.

9. The method for producing a photoresponsive nanoparticle with a perovskite-type crystalline structure according to claim 7, wherein the continuously transporting includes:
pumping the first raw material liquid from the first raw material liquid vessel to the heated mixer via the first flow path; and
pumping the second raw material liquid from the second raw material liquid vessel to the heated mixer via the second flow path.

10. The method for producing a photoresponsive nanoparticle with a perovskite-type crystalline structure according to claim 1, wherein the continuously transporting includes pumping the first raw material liquid and the second raw material liquid to the heated mixer through the transport path.

11. The method for producing a photoresponsive nanoparticle with a perovskite-type crystalline structure according to claim 1, further comprising, after a synthesis reaction in the mixer, discharging a synthesis liquid from the mixer via a flow path in communication with the mixer.

12. The method for producing a photoresponsive nanoparticle with a perovskite-type crystalline structure according to claim 11, further comprising, after discharging the synthesis liquid, collecting the photoresponsive nanoparticle with a perovskite-type crystalline in a collector.

13. A method for producing a photoresponsive nanoparticle with a perovskite-type crystalline structure, the method comprising:
a first step of continuously transporting a first raw material liquid containing a lead halide and a second raw material liquid containing a fatty acid cesium to a heated mixer through a transport path; and
a second step of mixing the first raw material liquid and the second raw material liquid,
wherein the first raw material liquid and the second raw material liquid are heated to a first temperature $x°$ C. before reaching the mixer,
wherein the first raw material liquid and the second raw material liquid are heated from the first temperature $x°$ C. to a second temperature $y°$ C. during the mixing,
wherein the first temperature $x°$ C. and the second temperature $y°$ C. satisfy formula (2):

$$120° \text{ C.} \leq x \leq 240° \text{ C.}, 120° \text{ C.} \leq y \leq 240° \text{ C.}, \text{abs}(y-x) \leq 20° \text{ C., and} \quad \text{formula (2)}$$

wherein the first raw material liquid and the second raw material liquid are continuously transported though the transport path to the mixer at a molar concentration ratio represented by formula (3):

$$[Pb]/[Cs] \geq 2.15. \quad \text{formula (3)}$$

14. A method for producing a photoresponsive nanoparticle with a perovskite-type crystalline structure, the method comprising:
a first step of continuously transporting a first raw material liquid containing a lead halide and a second raw material liquid containing a fatty acid cesium to a heated mixer through a transport path; and
a second step of mixing the first raw material liquid and the second raw material liquid,
wherein the first step is performed to transport the second raw material liquid continuously through the transport path based on fluidity of the second raw material liquid in a liquid phase temperature range of at least 10° C. within a liquid feed operation temperature range of 5° C. or more and 35° C. or less.

* * * * *